US012451318B2

(12) United States Patent
Wimmer et al.

(10) Patent No.: US 12,451,318 B2
(45) Date of Patent: Oct. 21, 2025

(54) CATHODE DEVICE WITH IMPROVED ELECTRON EMITTER CONTACTING

(71) Applicant: Siemens Healthineers AG, Forchheim (DE)

(72) Inventors: Michael Wimmer, Weisendorf (DE); Joerg Freudenberger, Kalchreuth (DE); Anja Fritzler, Erlangen (DE); Christoph Jud, Nuremberg (DE); Peter Geithner, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 0 days.

(21) Appl. No.: 19/039,935

(22) Filed: Jan. 29, 2025

(65) Prior Publication Data

US 2025/0246394 A1 Jul. 31, 2025

(30) Foreign Application Priority Data

Jan. 31, 2024 (DE) ..................... 10 2024 200 885.0

(51) Int. Cl.
*H01J 35/06* (2006.01)

(52) U.S. Cl.
CPC ....... *H01J 35/065* (2013.01); *H01J 2235/062* (2013.01); *H01J 2235/068* (2013.01)

(58) Field of Classification Search
None
See application file for complete search history.

(56) References Cited

U.S. PATENT DOCUMENTS 5,075,595 A 12/1991 Kane
6,333,968 B1 * 12/2001 Whitlock .............. B82Y 10/00 378/136

(Continued)

FOREIGN PATENT DOCUMENTS

DE 102009011642 A1 9/2010
EP 3933881 A1 1/2022

(Continued)

OTHER PUBLICATIONS

German Office Action and English translation thereof for German Application No. 10 2024 200 885.0 mailed Sep. 16, 2024.

(Continued)

*Primary Examiner* — Thomas R Artman
(74) *Attorney, Agent, or Firm* — Harness, Dickey & Pierce, P.L.C.

(57) ABSTRACT

One or more example embodiments relates to a cathode device and an X-ray source. The cathode device for an X-ray source has an electron emitter including a plurality of field effect emitter elements aligned in parallel to form an emission surface on the upper side of the plurality of field effect emitter elements aligned in parallel a gate electrode, arranged above the emission surface, a multiple first contact elements for at least two independently current-carrying current paths of the electron emitter, electrons from at least one of the current paths are emittable depending on an emission voltage between the gate electrode and the emission surface via the field effect emitter elements; and an emitter seat including multiple second contact elements, the multiple second contact elements connectable with the multiple first contact elements for closing the current paths.

19 Claims, 2 Drawing Sheets

(56) References Cited

U.S. PATENT DOCUMENTS

| | | | | |
|---|---|---|---|---|
| 7,826,594 | B2 * | 11/2010 | Zou | H01J 1/30 378/92 |
| 7,826,595 | B2 * | 11/2010 | Liu | H01J 35/147 378/138 |
| 8,295,441 | B2 * | 10/2012 | Beyerlein | H01J 35/065 378/92 |
| 9,748,071 | B2 | 8/2017 | Guerrera et al. | |
| 9,922,793 | B2 * | 3/2018 | Hori | H01J 31/28 |
| 10,242,836 | B2 * | 3/2019 | Iida | G01T 1/161 |
| 10,269,527 | B2 * | 4/2019 | Kenmotsu | H01J 35/112 |
| 10,741,353 | B2 | 8/2020 | Kenmotsu et al. | |
| 11,101,095 | B2 * | 8/2021 | Iida | H01J 31/127 |
| 11,145,431 | B2 * | 10/2021 | Lanza | H01J 35/186 |
| 11,778,717 | B2 * | 10/2023 | Jafari | H01J 35/065 378/113 |
| 2008/0043920 | A1 * | 2/2008 | Liu | H01J 35/065 378/138 |
| 2009/0185661 | A1 * | 7/2009 | Zou | H01J 1/30 315/294 |
| 2010/0226479 | A1 | 9/2010 | Beyerlein et al. | |
| 2015/0092923 | A1 * | 4/2015 | Iida | H01J 3/027 378/138 |
| 2015/0206698 | A1 * | 7/2015 | Hori | H01J 29/62 313/302 |
| 2015/0371810 | A1 * | 12/2015 | Guerrera | H01J 37/3007 250/396 R |
| 2016/0290936 | A1 * | 10/2016 | Jeong | G01N 23/04 |
| 2017/0004949 | A1 * | 1/2017 | Kenmotsu | H01J 35/112 |
| 2019/0189383 | A1 * | 6/2019 | Iida | H01J 3/14 |
| 2019/0221398 | A1 * | 7/2019 | Kenmotsu | H01J 35/112 |
| 2020/0085392 | A1 * | 3/2020 | Lanza | G01N 23/041 |
| 2021/0410258 | A1 | 12/2021 | Jafari et al. | |

FOREIGN PATENT DOCUMENTS

| | | | |
|---|---|---|---|
| EP | 3075000 | B1 | 8/2024 |
| WO | WO 2013136299 | A1 | 9/2013 |

OTHER PUBLICATIONS

German Decision to Grant and English translation thereof for German Application No. 10 2024 200 885.0 mailed Apr. 2, 2025.

Asadi R.F. et al.: "Failure Mode of Si Field Emission Arrays based on Emission Pattern Analysis," 2021 34th International Vacuum Nanoelectronics Conference (IVNC), Lyon, France, 2021, pp. 1-2.

* cited by examiner

CATHODE DEVICE WITH IMPROVED ELECTRON EMITTER CONTACTING

CROSS-REFERENCE TO RELATED APPLICATION(S)

The present application claims priority under 35 U.S.C. § 119 to German Patent Application No. 10 2024 200 885.0, filed Jan. 31, 2024, the entire contents of which are incorporated herein by reference.

FIELD

One or more example embodiments relates to a cathode device and an X-ray source.

RELATED ART

X-ray sources typically generate X-rays via electrons, which are produced by an electron emitter in a vacuum and, after being accelerated via high voltage, are decelerated when they interact with an anode. The electron emitters regularly used for this purpose can be divided in particular into so-called thermionic electron emitters and cold electron emitters. Thermionic electron emitters produce electrons in particular according to the Edison-Richardson effect by heating the emitter elements. Cold electron emitters emit electrons in particular without comparable heating, but rather according to the field effect, for example, via field effect emitter elements set up for this purpose.

Conventional electron emitters with field effect emitter elements are known in particular from U.S. Pat. No. 9,748,071 B2 or EP 3 933 881 A1. The first describes in particular a layout of the field effect emitter elements comprising emitter needles with transistor structures, preferably to enable switching of independent groups of the field effect emitter elements. By contrast, the latter concerns protection devices used to prevent charged particles impacting the field effect emitter elements during operation of such electron emitters.

WO 2013 136 299 A1 relates to an imaging device, comprising an electron-receiving construct and an electron-emitting construct, and moreover an inner opening to provide an unhindered space between the electron-emitting construct and electron-receiving construct. The imaging device also comprises a resistance layer that is arranged between the electron-emitting construct of the field emission type and the emitter seat.

In comparison to thermionic emitter elements, electron emitters with field effect emitter elements are regularly more prone to damage or even destruction by electrical discharge processes, especially high-voltage flashovers between the cathode device and the anode, within the X-ray source. Such high-voltage flashovers can, for example, cause a short circuit between the field effect emitter elements and the gate electrode of the electron emitter. With regard to the associated effects, see, for example, R. F. Asadi, T. Zheng, J. Da Silva, G. Rughoobur, A. I. Akinwande and B. Gnade, "Failure Mode of Si Field Emission Arrays based on Emission Pattern Analysis," 2021 34th International Vacuum Nanoelectronics Conference (IVNC), Lyon, France, 2021, pp. 1-2, doi: 10.1109/IVNC52431.2021.9600740.

SUMMARY

One or more example embodiments specifies a cathode device and an X-ray source, in which the damage from potentially destructive discharge processes may be reduced.

The object may be achieved by the features of the independent claims. Advantageous embodiments are described in the dependent claims.

Independent of the grammatical term usage, individuals with male, female or other gender identities are included within the term.

BRIEF DESCRIPTION OF THE DRAWINGS

The invention is described in more detail and explained below using the exemplary embodiments presented in the figures. In the following figure description, structures and units that essentially remain the same are generally labeled with the same reference sign as when the respective structure or unit first appears. These show in.

DETAILED DESCRIPTION

Figure 1:
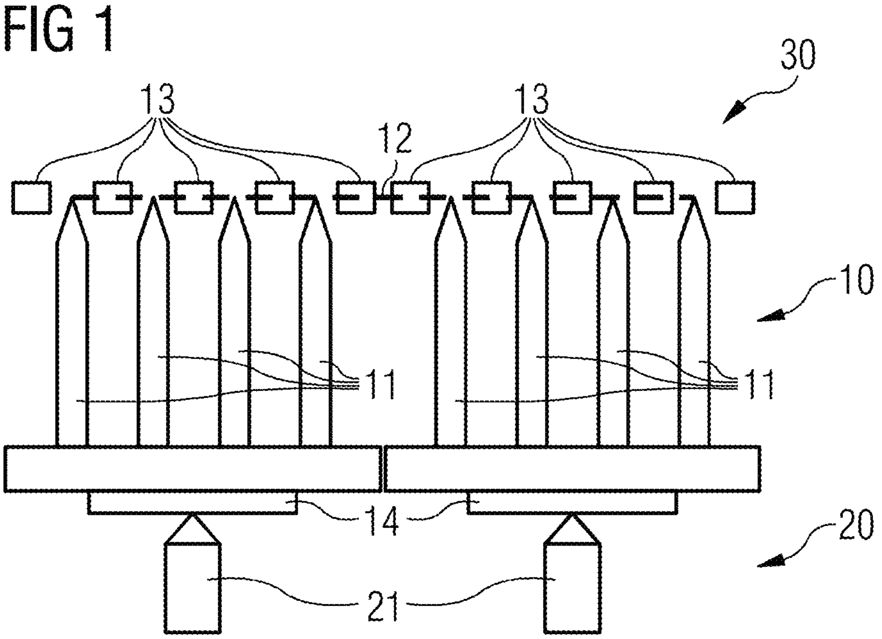
FIG. 1 illustrates a cathode device according to one or more example embodiments.

The cathode device according to one or more example embodiments for an X-ray source has an electron emitter and an emitter seat, the electron emitter having a plurality of field effect emitter elements aligned in parallel to form an emission surface on the upper side of the plurality of field effect emitter elements aligned in parallel, a gate electrode, arranged above the emission surface, and a plurality of first contact elements for at least two independently current-carrying current paths of the electron emitter, electrons from at least one of the current paths being emittable depending on an emission voltage between the gate electrode and the emission surface via the field effect emitter elements, characterized in that the emitter seat has multiple second contact elements, which are connectable with the multiple first contact elements for closing the current path, and in that the multiple first contact elements are arranged on a side of the plurality of field effect emitter elements aligned in parallel facing away from the emission surface.

The cathode device according to one or more example embodiments is particularly advantageous, since the electron emitters known from the prior art are normally contacted via structures which are integrated into and/or project into the emission surface of the electron emitter. The cathode device according to one or more example embodiments overcomes this disadvantage in that a change is made from front contacting to non-front contacting. Destructive discharges are advantageously reduced, since few if any such contacting structures are present in the emission surface.

The cathode device according to one or more example embodiments therefore in particular has no structures which protrude in the emission direction. The emission direction of the electron emitter is thus not restricted for other attachments. In particular, a focusing unit for the emitted electrons and/or a protective device against discharge processes above the electron emitter in the emission direction may be provided.

A further advantage of the cathode device according to one or more example embodiments relates to the possibility that the electron emitter, due to the multiple first contact elements may be aligned and/or inserted relative to the multiple second contact elements of the emitter seat, in particular during manufacture of the cathode device.

The X-ray source according to one or more example embodiments having the cathode device, an anode, and an evacuated housing, wherein the cathode device and the anode are arranged within the evacuated housing.

The anode can in particular be a rotating anode or a standing anode. It is conceivable in principle for the anode to rotate with the evacuated housing.

The electrons generated by the cathode device are in particular accelerated from the cathode device towards the anode via an acceleration unit. The acceleration unit comprises in particular a high voltage source or a high frequency source. Subject to the type of acceleration unit, the X-ray source is typically an X-ray emitter, especially for imaging applications in the keV range, or a linear accelerator, especially for imaging or therapeutic applications in the MeV range.

The cathode device is in particular a cathode for the X-ray source. The electrical potential of the cathode is typically more negative in comparison to the electrical potential of the anode.

The electron emitter is set up in particular to produce the electrons via the field effect emitter elements. The electron emitter is in particular a complete component, for example, an electron emitter chip. The electron emitter can, for example, consist of the number of field effect emitter elements aligned in parallel, the gate electrode, and the multiple first contact elements.

The term "number of field effect emitter elements" means in particular that so many field effect emitter elements are part of the emission surface that the emission surface has an electron current density of at least 0.1 A/cm^2, preferably at least 3 A/cm^2, but in particular advantageously at least 10 A/cm^2. The number of field effect emitter elements required for this is typically at least 1,000, regularly more than 1,000,000. The emission surface advantageously has dimensions of at least 0.1 to 0.1 cm^2 and/or a maximum of 10 to 10 cm^2.

The field effect emitter elements can be embedded in an insulating matrix. The insulating matrix preferably holds the number of field effect emitter elements together.

The field effect emitter elements are in particular aligned in parallel and/or flush in relation to the emission surface. In this instance, the emission surface is advantageously as level as possible. The emission surface can be post-processed in principle, in order to be as level as possible.

The field effect emitter elements typically have an emission point or an emission section at an end of each field effect emitter element. The emission surface consists in particular of the emission points or the emission sections of the field effect emitter elements. The emission point is, for example, the tip of a field effect emitter element embodied as a field effect emitter needle. The emission section comprises, for example, the emission point and an adjacent area around the emission point.

The emission surface is in particular the top of the number of field effect emitter elements. A top of the electron emitter can correspond to the top of the number of field effect emitter elements, in particular when disregarding the gate electrode and/or comprehensively integrating the gate electrode into the volume of the field effect emitter elements.

The sides of the number of field effect emitter elements define in particular the surfaces of the number of field effect emitter elements and are effectively synonymous in this description. The sides of the number of field effect emitter elements comprise in particular a top, a bottom and a lateral side. Accordingly, the surfaces of the number of field effect emitter elements comprise in particular a top surface, which typically corresponds to the emission surface, a bottom surface, and a lateral surface, which typically corresponds to the side surfaces.

The top and bottom side of the field effect emitter elements typically have the same dimensions and/or the same geometric form. The geometric form can be angular, especially square, preferably rectangular, or round.

The side surfaces of the plurality of field effect emitter elements aligned in parallel connect in particular the top and bottom side. The side surfaces of the plurality of field effect emitter elements aligned in parallel are formed in particular by the longitudinal sides of the outermost field effect emitter elements and/or by the matrix surrounding the outermost field effect emitter elements.

The side surfaces cover in particular the entire circumference of the field effect emitter elements, i.e., 360°. If the geometric form of the top side of the field effect emitter elements is round, a side surface is by definition a lateral surface covering a maximum 90° of the circumference. If the geometric form of the top side of the field effect emitter elements is angular, a side surface spans a lateral surface from one edge to an adjacent edge, wherein the edges connect in each case the respective corners of the top and bottom side.

It is conceivable that the field effect emitter elements are grown on a substrate. The substrate can be removed in principle once the field effect emitter elements have grown, for example, can be sanded off. The substrate is typically arranged on a bottom side of the field effect emitter elements.

The field effect emitter elements are embodied, for example, by field effect emitter needles, wherein their tips form the emission points and thus the emission surface. The field effect emitter needles are in particular nanotubes. Alternatively, it is conceivable for the field effect emitter elements to form at least one Spindt cathode.

It is regularly possible to integrate transistor structures, for example, into the field effect emitter needles, especially if the field effect emitter needles consist of a semiconductor such as silicon, carbon or molybdenum.

The field effect emitter elements are in particular switchable individually, in groups, or all together. Electron emitters that comprise field effect emitter elements switchable individually or in groups are typically so-called pixelated or segmented emitters. The segmented circuit of the field effect emitter elements and thus of the electron emitter can be effected via various first or second contact elements and/or a segmentation of the gate electrode.

Current paths are defined in this application in such a way that all field effect emitter elements that can only be switched on or off together, form a distinct current-carrying current path. Depending on the wiring, the number of field effect emitter elements can thus comprise a number of current paths for the individual field effect emitter elements, some current paths for field effect emitter elements switchable in groups, or a single current path if all field effect emitter elements are only switchable together. A separately switchable current path, in other words one that can be switched on or off via a contact element, is typically a current-carrying current path independent of other current paths.

Typically, each current path is assigned exactly one segment of the electron emitter. Such a segment of the electron emitter forms in particular one pixel.

The gate electrode can in particular be embodied as a grid. The gate electrode is in particular arranged in such a way above the emission surface as to cause electron emissions in the respective field effect emitter elements via the emission voltage between the gate electrode and the emission surface in accordance with the field effect. In this context, the term “above” includes that the gate electrode reaches as close as possible to the respective field effect emitter elements, for example, is arranged directly at the height of the ends of the field effect emitter elements forming the emission surface and/or surrounds these ends of the field effect emitter elements.

The gate electrode is advantageously arranged so as, for example, to minimize an electron emission in or on the gate electrode and/or thermal effects. Alternatively or additionally, the gate electrode is advantageously arranged in such a way as to maximize the electron emission in or on the anode and/or mechanical stability and/or robustness with regard to the high-voltage flashover, for example.

The emission voltage is applied in particular between the emission point or the emission section of the respective field effect elements and the gate electrode. The current path, from which the electrons for the electron emission come, is typically closed for the electron emission.

The potential of the gate electrode is regularly more positive than the potential of the field effect emitter elements. For example, the gate electrode can be at constant ground potential and the field effect emitter elements at negative potential. Alternatively, the field effect emitter elements can be at constant ground potential.

It is conceivable that the gate electrode can provide different emission voltages to the emission surface, in particular if the gate electrode is embodied as a grid. In this instance, the gate electrode can in particular be segmented, so that the electron emitter is a segmented electron emitter. For example, the emission voltage between groups of field effect emitter elements can be varied via the segmented gate electrode, for example, by varying the electrical potential of the segments of the gate electrode.

The multiple first contact elements and the multiple second contact elements are designed in particular to produce a secure electrical connection through mutual contacting. In particular, an electrical connection can be effected by a first contact element and a second contact element. This electrical connection typically closes the current path at this point in this respect. The multiple second contact elements are designed in particular in such a way as part of the emitter seat that they can be connected to the multiple first contact elements.

The contact elements can comprise contact points or contact surfaces. The contact points typically have a contact surface that is as small as possible but still electrically secure. It is conceivable for a first contact element to have a contact point and for a second contact element to have a contact surface, wherein the contact point of the first contact element and the contact surface of the second contact element can be connected to each other, or vice versa. A contact surface typically has larger dimensions than a contact point, so that these two contact elements have a certain amount of play relative to each other in a plane.

The field effect emitter elements can connect directly to the multiple first contact elements. The connection between the multiple first contact elements and the field effect emitter elements can be effected by the substrate throughout.

The field effect emitter elements are connected to a power source in particular via electrically connected contact elements. In this instance, a current path runs in particular from the power source via a second contact element, and a first contact element connected to it, to the field effect emitter element.

It is conceivable for a first contact element to be connected to one or more field effect emitter elements. A second contact element can be connected to one or more first contact elements. The number of first contact elements and second contact elements can be identical or can vary.

“Multiple contact elements” means in particular that the number of first contact elements or second contact elements is typically at least one order of magnitude less than that of field effect emitter needles. It is conceivable in principle that the number of first contact elements corresponds to the number of field effect emitter needles.

The number of first contact elements typically correlates to the number of current paths. The multiple first contact elements for the electron emitter’s at least two current paths carrying current independently of each other are connected with electrical conductivity in particular to the at least two current paths. The at least two current paths of the electron emitter can only comprise current paths of the field effect emitter elements, or other current paths in addition to the current paths of the field effect emitter elements, for example, an additional current path of the gate electrode, of the electron emitter.

“Connectable” means in particular electrically connectable, i.e., to produce an electrical connection. “Electrically connectable” means in particular electrically contactable. “Electrically connected” means in particular electrically contacted.

Depending on the embodiment of the cathode device, the connectable contact elements may already be electrically connected. Unconnected contact elements have in particular not closed an associated current path, but rather this is open. In principle the first contact elements and the second contact elements are equally connectable or mutually exchangeable.

The emitter seat typically has fixings, in order to fix and/or align the electron emitter on the emitter seat via the fixings. The emitter seat has in particular a carrier body to which the second contact elements are fixed. The carrier body and the second contact elements are usually electrically isolated. The second contact elements are in particular arranged on a side of the emitter seat facing the electron emitter, especially the carrier body.

The emitter seat, in particular the carrier body, can be designed as a focus head for the emitted electrons. The emitter seat, in particular the carrier body, can be metallic, especially also electrically conductive, for example, at a negative high voltage potential or ground potential. The emitter seat can be designed in such a way as to extend the current paths of the field effect emitter elements up to the power source, in order to facilitate a connection of the field effect emitter elements to the power source. For this purpose, the emitter seat can have, for example, at least one wire connecting a field effect emitter element to the power source.

The side turned away from the emission surface is in particular not the top surface or top side. The side turned away from the emission surface can in particular be the bottom side and/or a lateral side. In particular, the multiple second contact elements do not face the emission surface, but rather face the multiple first contact elements. If the multiple first contact elements face the multiple second contact elements, then the first contact elements and second contact elements are typically connectable.

One embodiment provides that the multiple first contact elements are exclusively arranged on the side facing away. This embodiment is advantageous in particular due to its compactness.

One embodiment provides that the side facing away from the emission surface is the lower side of the plurality of field effect emitter elements aligned in parallel opposite the emission surface and facing the emitter seat. This embodiment is advantageous in particular due to the contacting from below of the plurality of field effect emitter elements aligned in parallel.

One embodiment provides for the first contact elements to be arranged exclusively in a first plane. In particular, this simplifies a contacting of the field effect emitter elements. Exclusively means that no first contact elements are arranged outside of the first plane.

One embodiment provides for the multiple second contact elements to be arranged exclusively in a second plane. In particular, this simplifies a provision of the contacting of the field effect emitter elements. Exclusively means that no second contact elements are arranged outside of the second plane.

One embodiment provides for the first plane and the second plane to be aligned parallel to one another. This embodiment advantageously allows a comparatively simple contacting.

One embodiment provides for the multiple second contact elements and/or the multiple first contact elements to be designed to be movable for the connection. This embodiment is in particular advantageous, because contact may be made and broken again via the movable contact elements. In other words, the movable design advantageously enables the connection of connectable contact elements, in particular without changing the orientation of the electron emitter relative to the emitter seat. In particular, the multiple second contact elements are designed to be movable relative to the emitter seat for connection with the multiple first contact elements and/or the multiple first contact elements are designed to be movable relative to the electron emitter for connection with the multiple second contact elements. The movable design may be separate for individual or grouped contact elements or for all first contact elements and/or all second contact elements together.

One embodiment provides for the movable design to be achieved via an elastic connecting element. This embodiment is in particular advantageous for establishing an electrically safe, and at the same time flexible, connection. In particular, the least one elastic connecting element has a mechanical force transmitter, which is a press-fitted pin or a spring pin. Multiple press-fitted pins and/or spring pins may be part of the movable design of the contact elements. Depending on the type of movable design, multiple elastic connecting elements, in particular also separately for individual or grouped contact elements, may be provided.

One embodiment provides for the multiple second contact elements to have an exclusively force-fitting and/or form-fitting connection to the multiple first contact elements. The multiple second contact elements are connected to the multiple first contact elements in particular not with a material bond, i.e. in particular not soldered. This embodiment offers in particular the advantage of a reversible contacting, allowing an exchange of an electron emitter without removing the emitter seat from the cathode device or X-ray source.

One embodiment provides for the multiple first contact elements to be arranged according to a ball grid array (BGA) arrangement. In this case the multiple second contact elements are normally also arranged according to the ball grid array (BGA) arrangement. This embodiment is in particular advantageous because of the use of a standardized arrangement of the multiple first and/or second contact elements.

One embodiment provides for one contact surface of one of the multiple first contact elements and one contact surface of one of the multiple second contact elements to have different surface areas. In other words, the surface area of the one of the multiple first contact elements and the one of the multiple second contact elements differ. For example, it is conceivable that one of the contact surfaces is a contact point and thus the smaller of the two surface areas has approximately only the surface area necessary for a safe electrical connection.

Features, advantages or alternative embodiment variants mentioned in the description of the device are also applicable to the method and vice versa. In other words, claims for the method can be expanded with features of the device and vice versa. In particular, the device according to one or more example embodiments can be used in the method.

FIG. 1 shows a cathode device 30 according to one or more example embodiments in a schematic cross section. The cathode device 30 has an electron emitter 10 and an emitter seat 20.

The electron emitter 10 has a number of field effect emitter elements 11 aligned in parallel to form an emission surface 12 on the top of the number of field effect emitter elements 11 aligned in parallel. The field effect emitter elements 11 are arranged on an optional substrate. The emission surface 12 is perpendicular to the image plane of FIG. 1 and is marked by a dashed line.

The electron emitter 10 also has a gate electrode 13, which is arranged above the emission surface 12. The gate electrode 13 is embodied as a grid. The grid is arranged as close as possible to the ends of the field effect emitter elements 11.

Additionally, the electron emitter 10 has multiple first contact elements 14 for the at least two current paths of the electron emitter 10 carrying current independently of each other. The multiple first contact elements 14 are shown as fixed in FIG. 1.

A first current path in FIG. 1 comprises four field effect emitter elements 11 and a second current path four further field effect emitter elements 11, each of which is connectable via a separate first contact element 14 with a separate second contact element 21. The electron emitter 10 in FIG. 1 is thus a so-called segmented or pixelated emitter.

The emitter seat 20 has multiple second contact elements 21, which are connectable to the multiple first contact elements 14 for closing the current paths and are electrically connected in FIG. 1. Subject to the emission voltage between the gate electrode 13 and the emission surface 12, especially also the electrical connection between the contact elements 14, 21, electrons can be emitted from at least one of the current paths via the field effect emitter elements 11.

The multiple first contact elements 14 are arranged on a side of the number of field effect emitter elements 11 aligned in parallel that is turned away from the emission surface 12. In the case of the cathode device 30 of FIG. 1, the multiple first contact elements 14 are only arranged on the side that is turned away, wherein the side turned away from the emission surface 12 is the bottom of the number of field effect emitter elements 11 aligned in parallel that is opposite the emission surface 12 and facing the emitter seat 20.

The first contact elements 14 are only arranged in a first plane. The multiple second contact elements 21 are only arranged in a second plane. The first plane and the second plane are aligned in parallel to each other. The multiple first contact elements 14 are advantageously arranged according to a ball grid array (BGA).

A contact surface of one of the multiple first contact elements 14 and a contact surface of one of the multiple second contact elements 21 have a different surface area. The multiple second contact elements 21 each have one contact point, so that its surface area is smaller than the surface area of the associated multiple first contact elements 14.

Figure 2:
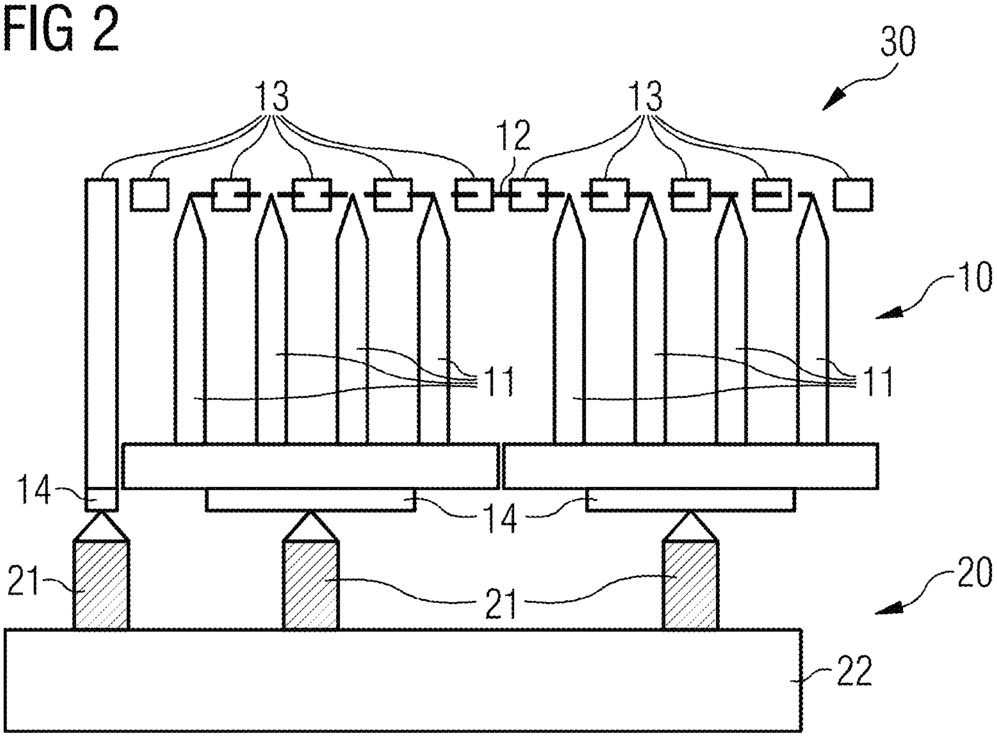
FIG. 2 illustrates a cathode device according to one or more example embodiments.

FIG. 2 shows a first exemplary embodiment of the cathode device 30 in a schematic sectional view.

The emitter seat 20 has a carrier body 22. The multiple second contact elements 21 are designed to move relative to the carrier body 22 for the connection. Alternatively or additionally, the multiple first contact elements 14 can be designed to move relative to the field effect emitter elements 11.

Another current path of the at least two current paths carrying current independently of each other has the gate electrode 13 and one of the multiple second contact elements 21. This current path also has an additional first contact element 14. A section of the gate electrode 13 may form the further first contact element 14.

The mobile design is effected via an elastic connecting element, wherein the at least one elastic connecting element has a mechanical power transmission, which is a press-fitted pin or a spring pin. The multiple second contact elements 21 are only connected to the multiple first contact elements 14 via force fitting. A form-fit connection would be conceivable as an alternative or additional option.

Figure 3:
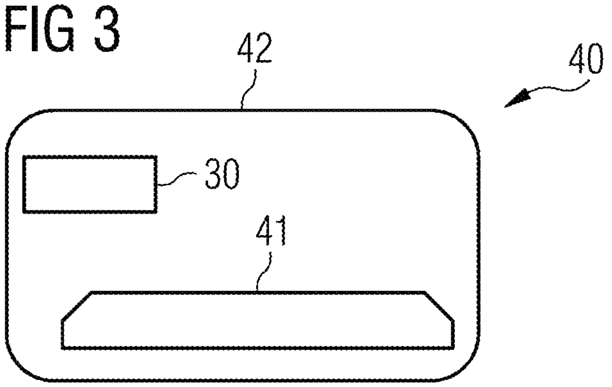
FIG. 3 illustrates an X-ray source according to one or more example embodiments.

FIG. 3 shows an X-ray source 40 in a schematic longitudinal section.

The X-ray source 40 has a cathode device 30, an anode 41, and an evacuated housing 42. The cathode device 30 and the anode 41 are arranged within the evacuated housing 42.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the invention has been illustrated and described in more detail by preferred exemplary embodiments, this shall not limit the invention to the disclosed examples, and other variations may be deduced from these by the person skilled in the art without extending beyond the scope of protection of the invention.

The invention claimed is:

1. A cathode device for an X-ray source, the cathode device comprising:

an electron emitter including, a plurality of field effect emitter elements aligned in parallel to form an emission surface on an upper side of the plurality of field effect emitter elements aligned in parallel, a gate electrode, arranged above the emission surface, a multiple first contact elements for at least two independently current-carrying current paths of the electron emitter, electrons from at least one of the current paths are emittable depending on an emission voltage between the gate electrode and the emission surface via the field effect emitter elements; and an emitter seat including multiple second contact elements, the multiple second contact elements connectable with the multiple first contact elements for closing the current paths, wherein the multiple first contact elements are on a side of the plurality of field effect emitter elements aligned in parallel facing away from the emission surface.

2. The cathode device of claim 1, wherein the multiple first contact elements are exclusively on the side facing away from the emission surface.

3. The cathode device of claim 1, wherein the side facing away from the emission surface is a lower side of the plurality of field effect emitter elements aligned in parallel opposite the emission surface and facing the emitter seat.

4. The cathode device of claim 1, wherein the first contact elements are exclusively in a first plane.

5. The cathode device of claim 4, wherein the multiple second contact elements are exclusively in a second plane.

6. The cathode device of claim 5, wherein the first plane and the second plane are parallel.

7. The cathode device of claim 6, wherein at least one of the multiple second contact elements or the multiple first contact elements are movable for a connection between the multiple second contact elements and the multiple first contact elements.

8. The cathode device of claim 7, wherein the movement is achieved via an elastic connecting element.

9. The cathode device of claim 8, wherein the at least one elastic connecting element includes a mechanical force transmitter.

10. The cathode device of claim 9, wherein the mechanical force transmitter is a press-fitted pin or a spring pin.

11. The cathode device of claim 1, wherein at least one of the multiple second contact elements or the multiple first contact elements are movable for a connection between the multiple second contact elements and the multiple first contact elements.

12. The cathode device of claim 11, wherein the movement is achieved via an elastic connecting element.

13. The cathode device of claim 12, wherein the at least one elastic connecting element includes a mechanical force transmitter.

14. The cathode device of claim 13, wherein the mechanical force transmitter is a press-fitted pin or a spring pin.

15. The cathode device of claim 1, wherein the multiple second contact elements are only connected to the multiple first contact elements via force-fitting or form-fitting.

16. The cathode device of claim 1, wherein the multiple first contact elements are arranged according to a ball grid array.

17. The cathode device of claim 1, wherein a further current path of the at least two current paths carrying current independently of each other has the gate electrode and one of the multiple second contact elements.

18. The cathode device of claim 1, wherein a contact surface of one of the multiple first contact elements and a contact surface of one of the multiple second contact elements have a different surface area.

19. An X-ray source, comprising:

the cathode device of claim 1;

an anode; and an evacuated housing, wherein the cathode device and the anode are within the evacuated housing.

* * * * *